Jan. 8, 1924. Re. 15,739

R. JACKSON, JR

BASKET BALL GOAL INDICATOR

Original Filed Feb. 1, 1921

INVENTOR.
Richard Jackson Jr.

BY
ATTORNEY.

Reissued Jan. 8, 1924. Re. 15,739

UNITED STATES PATENT OFFICE.

RICHARD JACKSON, JR., OF SAN FRANCISCO, CALIFORNIA, ASSIGNOR OF ONE-THIRD TO ALLYN R. REESE AND ONE-THIRD TO JAMES W. DOUGLAS, BOTH OF DENVER, COLORADO.

BASKET-BALL GOAL INDICATOR.

Original No. 1,381,466, dated June 14, 1921, Serial No. 441,581, filed February 1, 1921. Application for reissue filed February 20, 1922. Serial No. 538,119.

*To all whom it may concern:*

Be it known that I, RICHARD JACKSON, JR., a citizen of the United States, residing at San Francisco, in the county of San Francisco and State of California, have invented a new and useful Basket-Ball Goal Indicator, of which the following is a specification.

My invention relates to improvements in goal indicators particularly adapted for use in the game of basket ball, and its primary object is to provide a simple, practical and efficient appliance to indicate either visually or audibly, the fact that a ball has passed through the basket.

Another object of the invention is to provide in an appliance of the above mentioned character, an indicatory element, and a medium for its operation which is actuated by the ball as it passes through the basket.

An embodiment of my invention has been illustrated in the accompanying drawing in the several views of which like parts are similarly designated and in which—

Figure 1:
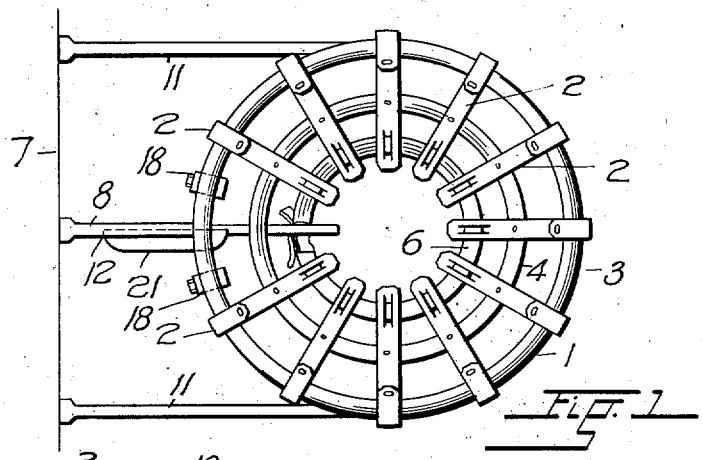
Figure 2:
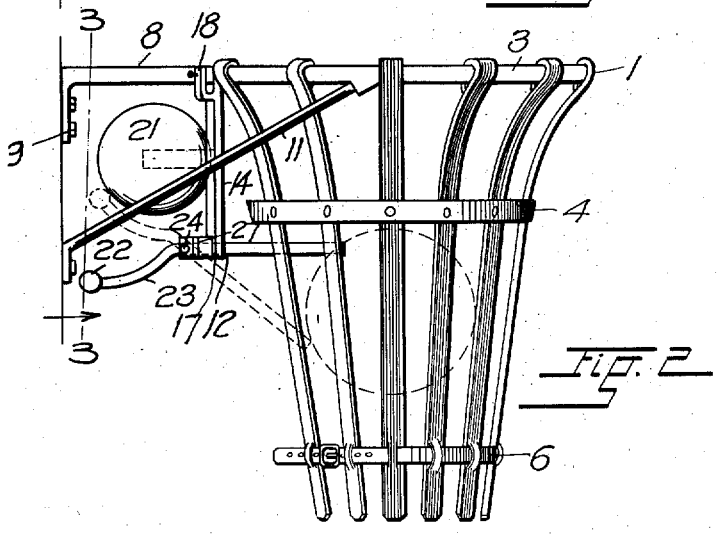
Figure 3:
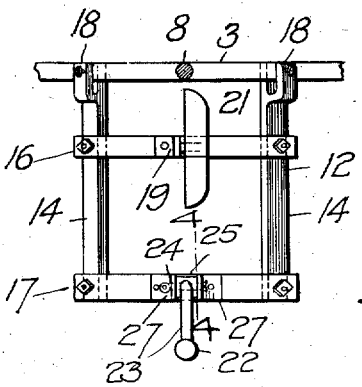
Figure 4:
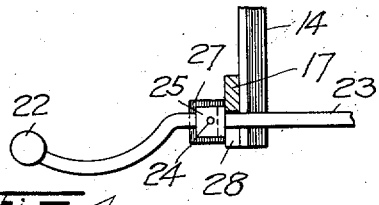

Figure 1 represeents a plan view of a basket adapted to be used in the game of basket ball, with my improved goal indicator attached thereto;

Figure 2, a side elevation of the same,

Figure 3, an elevation of the goal indicator looking in the direction of the arrow across the line 3—3, Figure 2; and Figure 4, a section taken on the line 4—4, Figure 3, drawn to an enlarged scale.

Referring to the drawing, the basket 1 consists of a number of strips 2 of leather or other suitable material, suspended from a ring 3 at substantially equal distances from each other, a flexible belt of smaller circumference than the ring, holding said strips in spaced relation at a distance below the ring, and a second, adjustable, belt 6 slidably fastened to the strips near their lower ends.

The basket is fastened to its support, indicated at 7, by a horizontal arm 8 having a downwardly extending end-portion for its attachment to the support, and by two braces 11.

The indicator appliance which in its entirety is designated by the numeral 12, comprises a frame composed of two upright members 14 and two transverse members 16 and 17 rigidly assembled by means of bolts or rivets.

The frame is mounted in operative relation to the basket, preferably by connection with the ring at the upper end thereof, and its upright members are for this purpose bifurcated at their upper extremities to embrace the ring, and provided with set screws which clampingly engage the same.

The frame carries on an arm 19 extending from its member 16, a gong 21 which in practice is sounded by a clapper 22 at an end of a lever 23 which is fulcrumed to swing in a vertical plane through the medium of a pin 24 on the lower member 17 of the frame. The other end of the lever extends into the basket sufficiently far for a ball falling through the basket, to engage it and force it downward so as to cause the clapper at the outer end of the lever to strike the gong.

To insure proper alinement between the lever and the gong, I provide a special bearing for the lever, consisting of a rectangular block 25 through which the lever extends and which swings on the pin 24.

The pin is supported in two parallel brackets 27 on the lower member 17 of the frame, which conjointly provide a guide way for the block 24 to prevent of lateral displacement of the lever in its operative movement.

The lever is held in its normal position of rest in which it extends in a substantially horizontal direction, into the basket in a groove 28 of the member 17 of the frame, and its outer member is curved in order to adapt itself to the shape of the gong.

It will be understood that the goal indicator as shown and described, is applicable to baskets of different constructions and that it may be effectively used in connection with a ring or other similar device of any game of skill which has for its object the passage of a ball or other body thrown or batted by the players, along a predetermined course.

It will furthermore be apparent that the indicatory element of the appliance may be of a character to indicate the passage of the ball through the basket by visual means instead of or in addition to an audible signal such as the gong herein shown and described, and that variations in the construction and arrangement of the elements and members of the indicator and the method of applying it to the basket may be resorted to within the scope of my invention as defined in the following claims.

What I claim and desire to secure by Letters Patent is:

1. The combination with a basket ball basket comprising a ring and a basket depending therefrom, of a goal indicator having a frame secured to said ring, a gong on said frame, and a lever fulcrumed on the frame, one end of the lever extending into the basket and the other end being adapted to sound the gong.

2. The combination with a basket of the character described, of a goal-indicator comprising a frame, a gong supported thereon, and a lever fulcrumed on the frame, one end of the lever extending into the basket and the other end being adapted to sound the gong.

3. The combination with a basket of the character described, of a goal-indicator comprising a frame having guide-members, a gong on the frame, a block pivoted between said guide-members, and a lever extending through said block, one end of the lever extending in the basket and the other end being adapted to sound the gong.

4. The combination with a basket of the character described, of a goal-indicator comprising a frame, a gong supported thereon, a block pivoted on the frame, and a lever extending through said block, one end of the lever extending in the basket and the other end being adapted to sound the gong.

5. The combination with a basket of the character described, of a goal-indicator comprising a frame, a gong supported thereon, and a lever fulcrumed on the frame, having one end extending in the basket and its other end adapted to sound the gong, the frame having means for balancing the lever in its normal position of rest.

6. The combination with a basket of the character described, of a goal-indicator comprising a frame, a gong thereon, and a lever fulcrumed on the frame, one end of the lever extending in the basket and the other end being adapted to sound the gong, and means to limit the movement of the lever to one plane.

7. The combination with a basket of the character described, of a goal indicator comprising a gong and a lever, one end of the lever extending in the basket, and the other end being adapted to sound the gong.

8. The combination with a basket of the type used in the game of basket ball, of a bracket secured thereto and an indicatory device outside the basket, and means extending into the basket, for the operation of said device by a ball passing through the basket.

9. An attachment for basket-ball baskets comprising a substantially U-shaped bracket, a member connecting the legs of the bracket and having an indicatory device thereon, and a lever pivoted intermediate its ends to the lower end of the bracket to actuate the indicatory device.

10. The combination with a support and an open-ended basket mounted on the support to extend axially vertically forward thereof for the passage of a ball in the game of basket-ball, of a gong on the support and means for sounding the gong by the downward passage of a ball through the basket.

11. The combination with a support and a basket thereon, of the type used in the game of basket-ball, of an indicating device on the support, and means for actuating said device by the passage of the ball through the basket.

12. In a basket ball goal, the combination with a basket having a wall contracted to a narrow throat, of a lever in the path of a ball passing through said throat, an indicating device, and mechanism for the operation of said device by movement of the lever.

13. In a basket ball goal, the combination of a basket, a lever adapted to extend in a substantially horizontal position across the opening of the basket to obstruct the downward passage of a ball, means to cause the lever to assume said position, there being a stop to limit the upward movement of the lever by said means, an indicating device, and means adapted to cause an operation of the device by downward movement of the lever.

In testimony whereof I have affixed my signature.

RICHARD JACKSON, Jr.